United States Patent
Baldwin et al.

(10) Patent No.: US 7,340,579 B2
(45) Date of Patent: Mar. 4, 2008

(54) MANAGING SANS WITH SCALABLE HOSTS

(75) Inventors: Duane Mark Baldwin, Mantorville, MN (US); David Lynn Merbach, Rochester, MN (US); Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/987,055

(22) Filed: Nov. 12, 2004

(65) Prior Publication Data

US 2006/0106999 A1  May 18, 2006

(51) Int. Cl.
G06F 13/00 (2006.01)
G06F 13/28 (2006.01)

(52) U.S. Cl. .................................................. 711/173
(58) Field of Classification Search ................. 711/173
See application file for complete search history.

(56) References Cited

U.S. PATENT DOCUMENTS

| | | | |
|---|---|---|---|
| 6,400,996 B1 * | 6/2002 | Hoffberg et al. | 700/83 |
| 2003/0172239 A1 * | 9/2003 | Swank | 711/163 |
| 2004/0103147 A1 * | 5/2004 | Flesher et al. | 709/204 |

OTHER PUBLICATIONS

Douglas A. Reynolds and Richard C. Rose; Robust Text-Independent Speaker Identification Using Gaussian Mixture Speaker Models; Journal; Jan. 1995; vol. 3, No. 1; IEEE Transactions on Speech and Audio Processing.

* cited by examiner

*Primary Examiner*—Kevin L. Ellis
*Assistant Examiner*—Hamdy S Ahmed
(74) *Attorney, Agent, or Firm*—Dillon & Yudell LLP

(57) ABSTRACT

A method, system, and computer program product for providing enhanced management features for a SAN with scalable hosts. Partitioned hosts (or 'scalable' hosts) are managed by extending SAN manager host-centric logical views to show (1) the host partition hierarchy and (2) the storage resource ownership for a SAN-attached scalable host. The extended host-centric view includes the host system, hosting OSes (if applicable), hosted OSes for each hosting OS (or the host system), OS volumes for each hosted OS, and logical mapping of each OS volume to the SAN storage resource (logical unit). The SAN manager is extended to also show how hosting (trusted) partitions, blades, and/or cluster members physically connect into a SAN. Users are able to toggle between a host centric view and a physical topology view by selection of items within the interface.

20 Claims, 7 Drawing Sheets

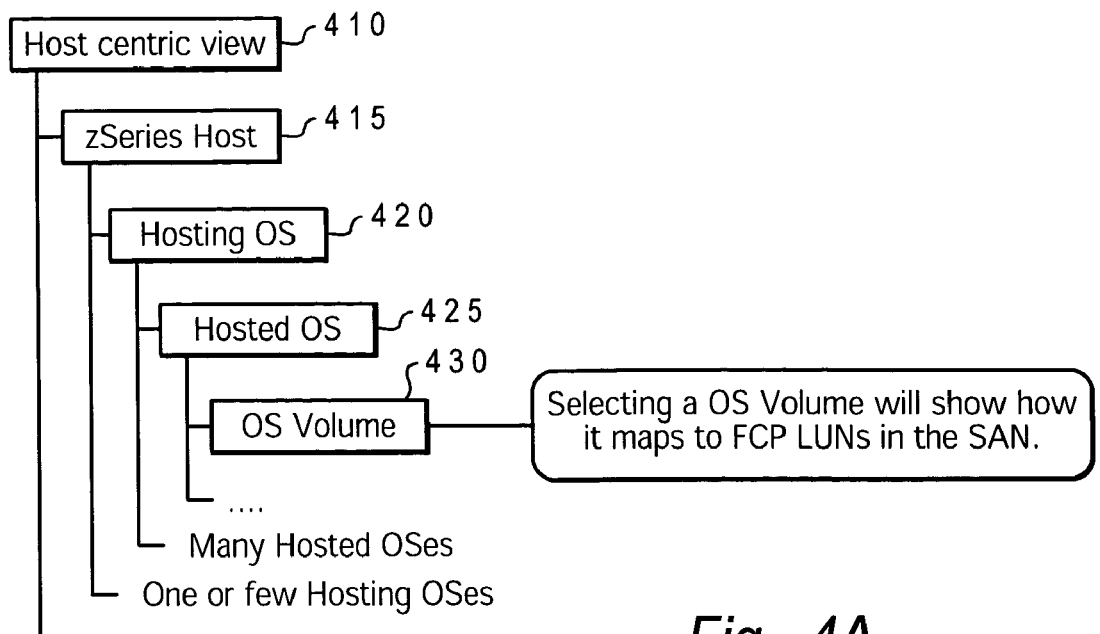
Fig. 4A
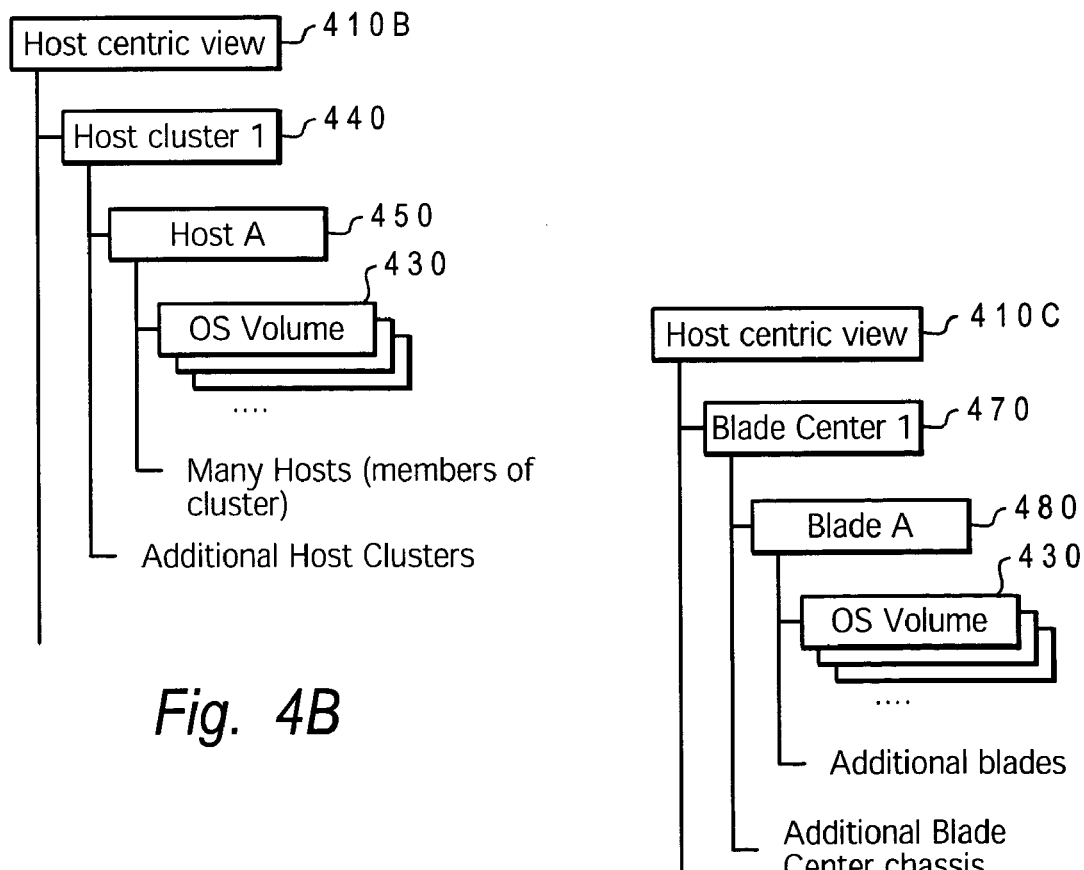
Fig. 4B
Fig. 4C

MANAGING SANS WITH SCALABLE HOSTS

BACKGROUND OF THE INVENTION

1. Technical Field

The present invention relates generally to computer networks and in particular to storage area networks (SANs). Still more particularly, the preset invention relates to a method and system for managing SANs.

2. Description of the Related Art

Storage area networks (SANs) are distributed storage systems developed to increase the efficiency of high performance computer systems that typically require large amounts of easily accessible storage. A SAN comprises an array of disks connected by a Fibre optic switch fabric to storage servers. The storage servers are connected to a network that delivers the storage services to the high performance computer systems. In addition to the network of storage disks, the SAN typically also include switches, servers, and disk subsystems.

Included within a convention SAN management environment are a SAN manager engine, a topology repository, a discovery list and a configuration table. The SAN manager engine communicates with management agents of devices of the SAN to retrieve configuration data from each agent. The management agents in switches store configuration information.

The topology repository includes data from all SAN devices as collected by the SAN manager from manager agents. The SAN manager can also generate a topology tables based on the data in the repository. The discovery list provides information on all SAN devices.

SANs are managed using SAN management software. An important feature of conventional SAN management software is automatic discovery of all SAN devices, including the servers, switches, and disk subsystems, in a SAN. SAN management software also stores a topology of the discovered SAN devices. Conventional SAN management software also enables an operator to visualize the topology of a single type of network. For example, SAN management software enables an operator to view the topology of a fibre channel ("FC") SAN.

Conventional SANs, such those provided by IBM eServer brands, have (or are working towards having) multiple logical or physical (blades) partitions in a host that have SAN connectivity. Logical OSes share one or more HBAs (host bus adapters) connected to a SAN. Typically there will be one or more "hosting" or trusted partitions that own the HBA(s). These hosting partitions host many "hosted" (or untrusted) OS partitions that have a virtual view of the HBA. Also, a host system may consist of many physical partitions (blades), with some or all partitions having dedicated HBAs and SAN connectivity via a bundled fibre channel switch in the host system.

The present invention recognizes that new SAN management functionality is needed to manage environments with these multi-partition host systems. The invention further recognizes that it would be desirable to include within the management functionality a graphical presentation of the partition hierarchy and relationships, as well as logical SAN storage resource views within a partition. These and other benefits are provided by the invention described herein.

SUMMARY OF THE INVENTION

Disclosed is a method, system, and computer program product for providing enhanced management features for a SAN with scalable hosts. The invention manages partitioned hosts (or 'scalable' hosts) by extending SAN manager host-centric logical views to show (1) the host partition hierarchy and (2) the storage resource ownership for a SAN-attached scalable host. The extended host-centric view includes the host system, hosting OSes (if applicable), hosted OSes for each hosting OS (or the host system), OS volumes for each hosted OS, and logical mapping of each OS volume to the SAN storage resource (logical unit).

In one implementation, the SAN manager is extended to also show how hosting (trusted) partitions, blades, and/or cluster members physically connect to a SAN. All physical host partitions with physical connections into the SAN are discovered by SAN manager topology discovery mechanisms. In another implementation, additional functions are added that highlight all host partitions in a physical SAN topology view that belong to a particular scalable host. This later implementation is accomplished whenever the user selects a scalable host in the SAN manager host centric view. Conversely, when the user selects a physical host partition in the topology view the implementation enables the owning host system (or cluster) to be located in the host-centric view. Other (standard) SAN Manager functions are also available for the scalable host, including device state indication, operating state roll-up of the partitions, event monitoring, detailed properties, and launch of system management utilities.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 4A-4C are illustrations of host-centric views for a logical partition, clusters, and blade center within SAN manager in accordance with one implementation of the invention;

DETAILED DESCRIPTION OF AN ILLUSTRATIVE EMBODIMENT

The present invention provides a method, system, and computer program product for providing enhanced management features for a SAN with scalable hosts. The invention manages partitioned hosts (or 'scalable' hosts) by extending SAN manager host-centric logical views to also show (1) the host partition hierarchy and (2) the storage resource ownership for a SAN-attached scalable host. The SAN manager is also extended to show how hosting (trusted) partitions, blades, and/or cluster members physically connect into a SAN. Users are able to toggle between the host centric view and physical topology view by selection within the interface.

Figure 1:
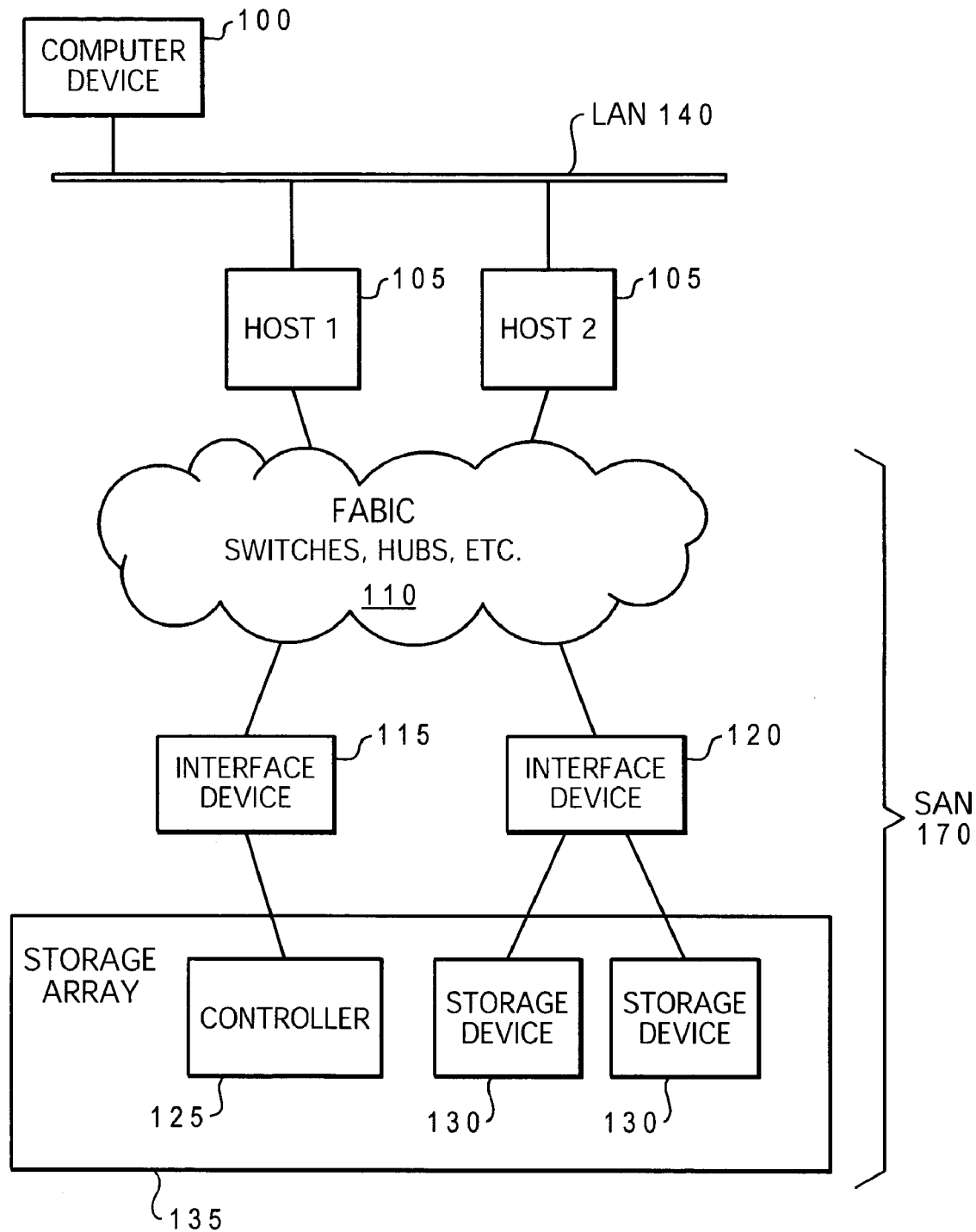
FIG. 1 is a block diagram of interconnected components comprising an exemplary SAN.

With reference now to the figures, and in particular to FIG. 1, there is illustrated a SAN environment within which the features of the present invention may advantageously be implemented. SAN environment comprises SAN 170, a plurality of host devices (hosts) 105 and a computer device/system 100 connected to the hosts 105 via LAN 140. The hosts 105 are connected to SAN 107 via a SAN fabric 110. SAN fabric 110 may include several switches, hubs, etc. connected to, among other things, interface devices 115. As shown in FIG. 1, SAN 170 also includes a storage array 135, with a controller 125 and multiple storage devices 130 associated therewith. Controller 125 performs certain control functions for the storage array 314.

Conventionally, in order to produce a topology map for the SAN 170, one or both of the hosts 105 may detect the storage array 135 (by detecting the controller 125) attached to the interface device 115, as well as the storage device 318 attached to the interface device 312, using conventional techniques. The computer system 100 may then determine whether the detected storage device 130 is one of the storage devices associated with the detected storage array 135.

Figure 2A:
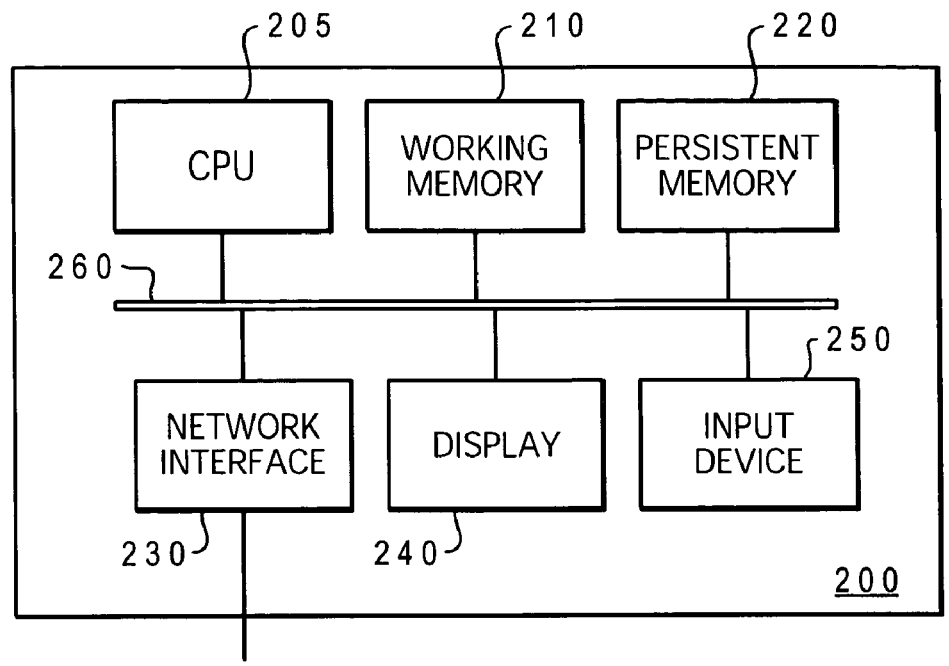
FIG. 2A is a block diagram of components of a computer system that provides the hardware and software functionality of a SAN manager that may be advantageously utilized in the present invention.

FIG. 2A illustrates an exemplary computer system that may advantageously be utilized to provide the SAN management functions of the present invention. In the embodiments of the invention, the SAN manager and associated functions may include or be resident on computer system 100. Computer system 100 includes a central processing unit ("CPU") 205, working memory 210, persistent memory 220, network interface 230, monitor/display 240 and input device 250, all communicatively coupled to each other via system bus 260. CPU 205 is a processor capable of executing software stored in persistent memory 220. Working memory 210 may include random access memory ("RAM") or any other type of read/write memory devices or combination of memory devices. Persistent memory 220 may include a hard drive, read only memory ("ROM") or any other type of memory device or combination of memory devices that can retain data after computer system 200 is shut off.

During operation, network interface 230 is communicatively coupled, via wired or wireless techniques, to SAN 100. Monitor/display 240 includes a liquid crystal display ("LCD") display, cathode ray tube display or other display device. Input device 250 includes a keyboard, mouse, or other device for inputting data, or a combination of devices for inputting data.

One skilled in the art will recognize that the computer system 100 may also include additional devices, such as network connections, additional memory, additional processors, LANs, input/output lines for transferring information across a hardware channel, the Internet or an intranet, etc. Also, one skilled in the art will recognize that the programs and data may be received by and stored in the system in alternative ways.

Figure 2B:
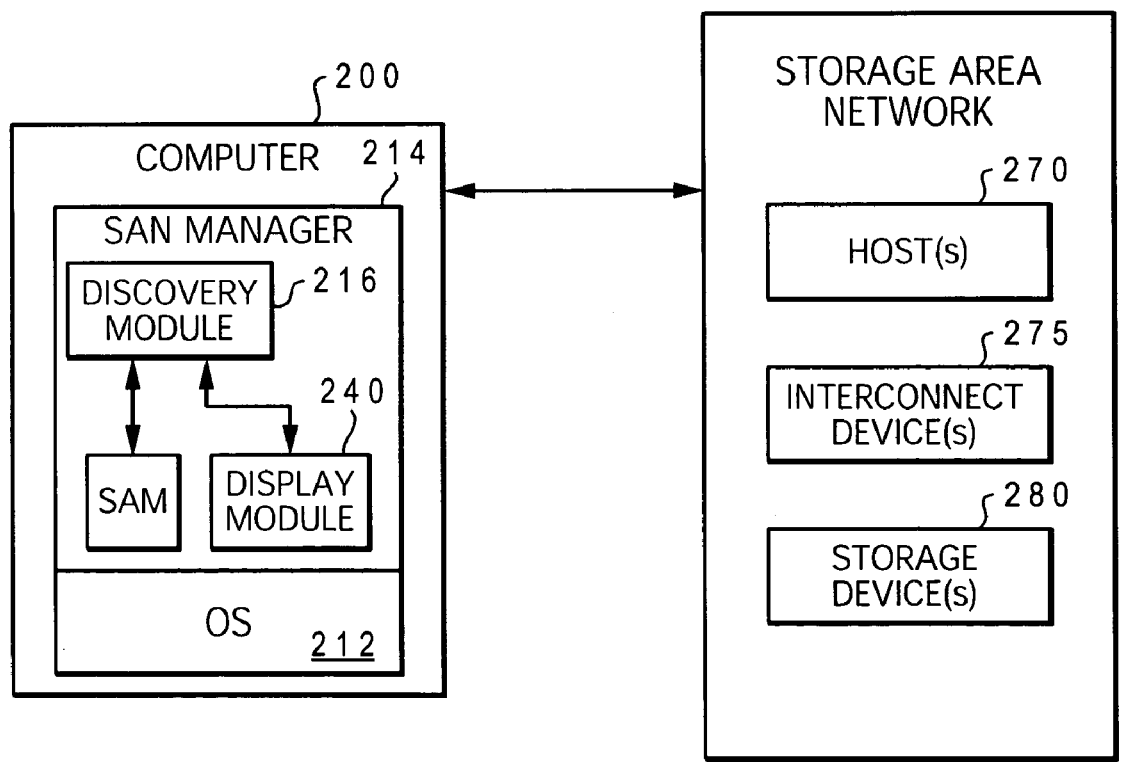
FIG. 2B is a block diagram illustrating software components of the SAN manager and interconnection of computer system of FIG. 2A to SAN in accordance with one implementation of the invention.

In addition to the above described hardware component, computer system 100 also comprises software components that enable the various functions of SAN management, including the novel functions introduced by the invention. FIG. 2B illustrates computer system 100 with software components including an operating system (OS) 212 and a SAN manager 214, (which may both exists within working memory 210 and/or persistent memory 220). OS 212 enables general operation of computer system 100 and the interaction/intercommunication amongst the various hardware components. SAN manager 214 is primarily a software utility and comprises program code for completing each of the standard SAN management functions, including device discovery (e.g., discovery module 216), monitoring, and management. Thus, in addition to the novel features of the invention, other (standard) SAN Manager functions are also available for the scalable host, including device state indication, operating state roll-up of the partitions, event monitoring, detailed properties, and launch of system management utilities.

SAN management utility includes a display utility/module 240, which includes the program code required to complete the various extended functions of SAN M utility 214. One major function of display module 240 is to provide a SAN Manager graphical user interface (GUI) that is visually outputted to monitor/display 240 of computer system 100. User interaction with the SAN management functions including the interface functions provided by display module 240 is enabled with the input devices 250.

Computer system 100 is shown with a connection to SAN 170, which includes one or more hosts 270, one or more storage devices 280 and a number of interconnect devices 275. In addition to the standard functions, as is described in greater details below, SAN management utility 214 is extended (via display module 240 and other functional additions) to include the following functional features: (1) providing a host-centric logical view that includes host partition hierarchy and storage resource ownership for a SAN-attached host 270; and (2) provide a view of how hosting (trusted) partitions, blades, and/or clusters physically connect into the SAN 170. In the illustrated embodiments, the extended host-centric view will show the host system, hosting OSes (if applicable), hosted OSes for each hosting OS (or the host system), OS volumes for each hosted OS, and logical mapping of each OS volume to the SAN storage resource (logical unit).

In one implementation, all physical host partitions with physical connections into the SAN are discovered by SAN manager topology discovery mechanisms (provided by discovery module 216). In another implementation, additional functions are added, which highlight all host partitions in a physical SAN topology view that belong to a particular scalable host. This later implementation is triggered/accomplished whenever the user selects a scalable host in the SAN manager host centric view. Conversely, in one implementation, when the user selects a physical host partition in the topology view, the invention enables the owning host system (or cluster) to be located in the host-centric view.

According to the invention, a hierarchical host-centric view to show logical partitions in the SAN Manager GUI is made possible by use of extended agent architecture. The extended agent architecture deploys full function agents to the hosting (trusted) OSes and lightweight minimal function agents to the hosted OSes. The agent architecture is described in PCT Application No. EP 03/50895, filed on Nov. 25, 2003. The relevant content of that application is hereby incorporated by reference. The extended agent architecture of the invention is an extension of that agent architecture, extended to include features required for capturing the relevant data required for providing the host centric view. To manage the scaleable host architecture, two types of agents are deployed on the partitions: (1) a thick SAN management agent and (2) a thin SAN management agent. The specific features provided by each of these extended agents are listed below.

The thick SAN management agent is deployed on the hosting partitions and enables management of physical aspects of the SAN topology. This agent shares some similarity to existing agents of SANM and provides the following functions: (1) in-band fibre channel access (for discovery, configuration, event monitoring); (2) physical HBA & port health and statistics; (3) HBA API (application programming interface) library management; and (4) Fibre Channel Protocol (FCP) Logical Unit (LU) mapping information (to enable SANM logical views). FCP LU is a storage resource in an FC SAN.

The thin SAN management agent is deployed on the hosted partitions and enables management of the hosted partition's limited view of SAN storage resource. The thin agent provides the following functions: (1) logical connection statistics; and (2) FCP LU mapping information.

In another embodiment, SRM (storage resource management) agents are also deployed on the hosted partitions, and these SRM agents provide additional management capability, including: (1) file system reporting LU provisioning; and (2) file system extension. The deployment of SRM agents is an optional component of the invention.

Figure 6A:
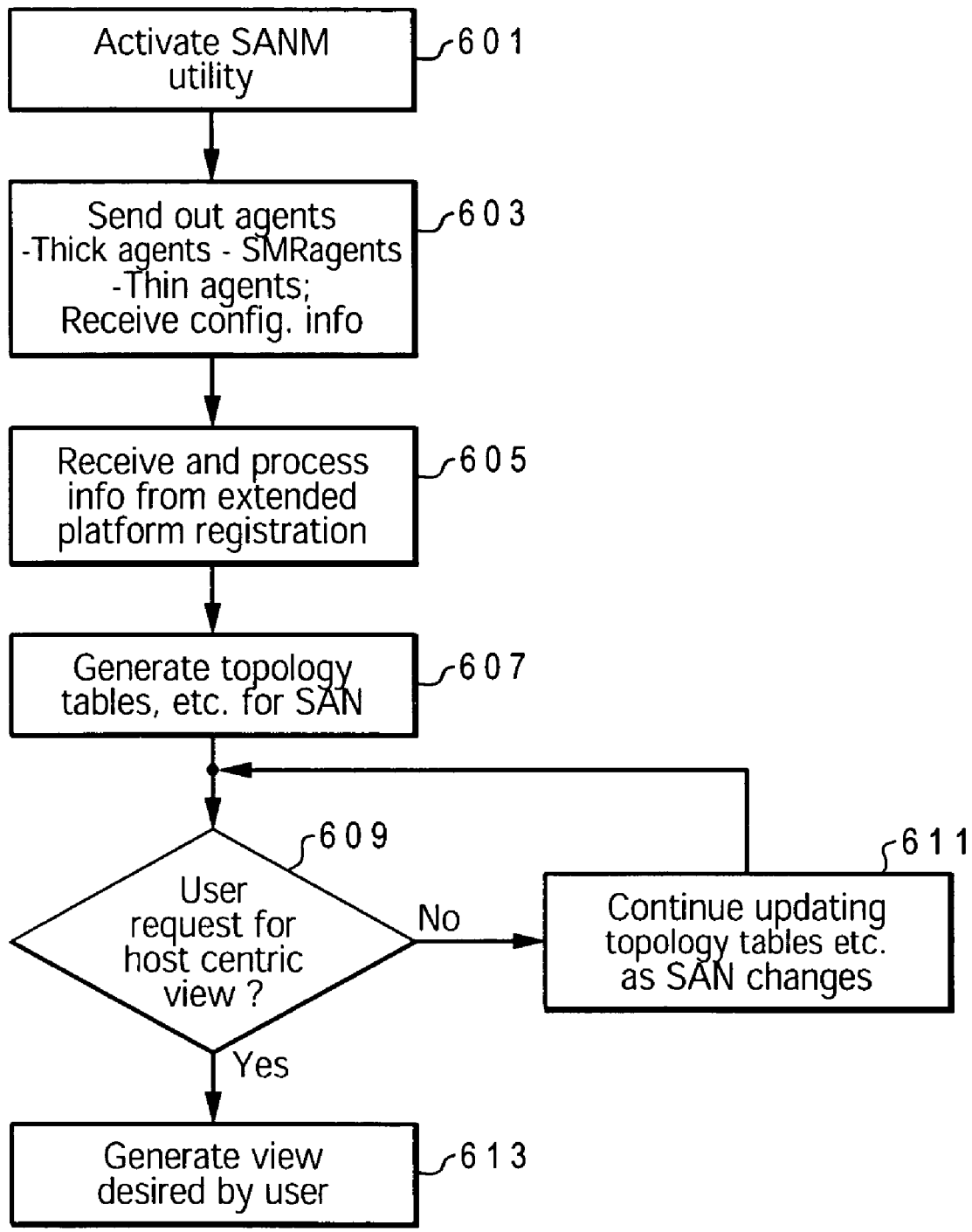
FIG. 6A is a flow chart of the process of setting up the SAM management utility to provide configuration information via a host centric view in accordance with one embodiment of the invention.

FIG. 6A provides a flow chart of the process of configuring the SAN management (referred to hereinafter as SANM) utility (i.e., SAN management extended with the display utility and extended agent mechanisms) with necessary information about the SAN architecture. The process begins at step 601 when the SANM utility is activated. The SANM utility then deploys thick SANM agents on the hosting partitions and deploys thin SANM agents on the hosted partitions, as shown at step 603. The utility then receives other information from extended platform registration(s) as shown at step 605. With the configuration information gather by the agents and extended platform registration(s), the utility processes the information and creates and/or populates configuration tables, etc. for the SAN, as indicated at step 607. The utility then waits for user input and determines at step 609 whether a user request is received for display of a host centric view. When a user request for a host centric view is received, the view is generated from the configuration tables and displayed within the GUI to the user, as shown at step 613. Otherwise, as illustrated at step 611, the utility continues updating the configuration information as changes are made to the SAN.

Figure 3:
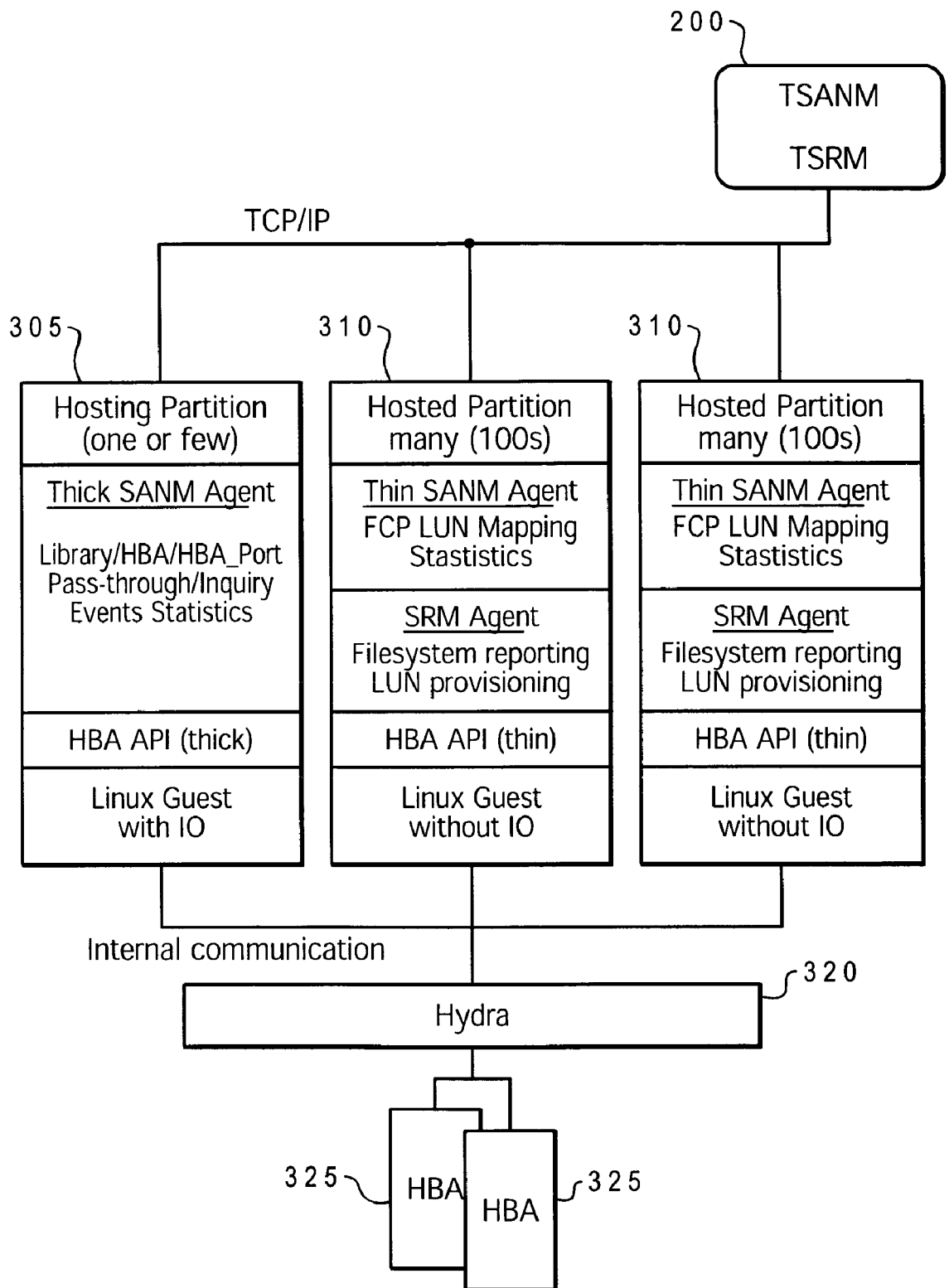
FIG. 3 is a block diagram of the hosting/hosted management agent architecture according to one embodiment of the invention.

FIG. 3 shows an example of the new SAN management agent architecture and functions applied to a zSeries Linux architecture (i.e., an IBM mainframe zSeries model running Linux operating system) of International Business Machines (IBM). Specifically, FIG. 3 illustrates a hosting and hosted management architecture with a logical view of the SAN connected to SAN manager within FIG. 2B. As illustrated, SAN manager connects to one hosting partition 305 having two affiliated hosted partitions 310. The partitions are internally connected to each other via a connecting bus. Additionally, the partitions are connected to an IO processor 210, which connects to multiple host bus adapters (HBAs) 325. As illustrated, the architecture includes one or more "hosting" or trusted partitions (i.e., hosting partition 305) that own the HBA(s) 325. These hosting partitions each host one or more "hosted" (or untrusted) OS partitions (hosted partitions 310) that have a virtual view of the HBAs 325.

Deploying the above SANM agent architecture (as provided by FIG. 3) allows SAN manager to extend the logical host-centric view to show multi-partition host participation in a SAN environment. Thus, as provided by the illustrative embodiment, two additional views (levels) are added to the hierarchical View in the SAN management GUI. These additional views are constructed from information gathered by the SANM agents. FIG. 4A illustrates the first of three extended host-centric views with one or more additional levels constructed from the information provided by the SANM agents.

Beginning at the very top, the levels within the host centric view 410 includes the host 415, below which is provided the hosting OS 420, then the hosted OS 425, followed by the OS volume 430. Notably, at each level, additional similar components may be included. Thus, a particular host may be illustrated with multiple "hosting OSes" at the next level, and a particular hosting OS may be illustrated with multiple "hosted OSes" at the next level, and so on. A user is able to view the different components by scrolling up and down the GUI using a scroll function provided. Also, with one embodiment, while in the particular host centric view, a user selection of an OS volume results in the automatic display within a "details" window/GUI of the OS volume's mapping to the FCP LUs in the SAN.

In one implementation, one additional level is added to the host-centric view, and this addition enables SAN manager to be extended to show participation of both (or either) host clusters and blade farms (e.g., IBM BladeCenter) in SAN environments. Unlike with the view of FIG. 4A described above, however, the necessary information to enable these views (of both the hot clusters and/or blade farms) may be collected without SANM agents. Rather, in one embodiment, the information for these views is collected via extended platform registration capabilities, which are defined in a new fibre channel standard, T11/FC-GS-4. The T11/FC-GS-4 standard is described at world-wide web (www) site "T11.org," the relevant content of which is hereby incorporated by reference. One benefit of not having to utilize agents to provide the information for these views is the significant advantage with respect to scaling management capabilities for large SAN environments. Extended platform registration allows platforms (the blades or hosts) to register with the fabric, and to also indicate the system identifier (ID) or cluster ID to which it belongs. Using the extended platform registration, SANM GUI is then extended to provide the two views illustrated by FIGS. 4B and 4C.

FIG. 4B illustrates a host centric view 410B for clusters. The first level displays the host cluster 1 440, which supports the next level at which a host (host A) 450 of the host cluster 440 is displayed. The next level provides the OS volumes 430 of the host 450. As with the view 410A of FIG. 4A, each level is capable of having additional components, e.g., multiple hosts 450 may be illustrated at the level below the host cluster 440. Also, similarly to the logical partition host centric view 410A, user selection of an OS volume 430 results in a display of how the OS volume 430 maps to FCP LUs in the SAN.

FIG. 4C illustrates a host centric view 410C for blades. The first level displays blade center 1 470, which supports the next level at which a blade (Blade A) 480 within the blade center 470 is displayed. The final level again provides the OS volumes 430 associated with blade A 480. Similarly to the view 410A of FIG. 4A, each level is capable of having additional components, e.g., multiple blades 480 may be illustrated at the level below the blade center 470. Also, user selection of an OS volume 430 results in a display of how the OS volume 430 maps to FCP LUs in the SAN.

For each of the above illustrated views (410A-410C), a "find" function is provided within the SANM GUI to enable the user to locate a host partition or OS volume among the stacks of OS partitions (which may run in the hundreds) or OS volumes (which may run in the thousands). Other user input is also supported to enable user-management or user-direction of the management functions of the SAN manager.

Figure 5:
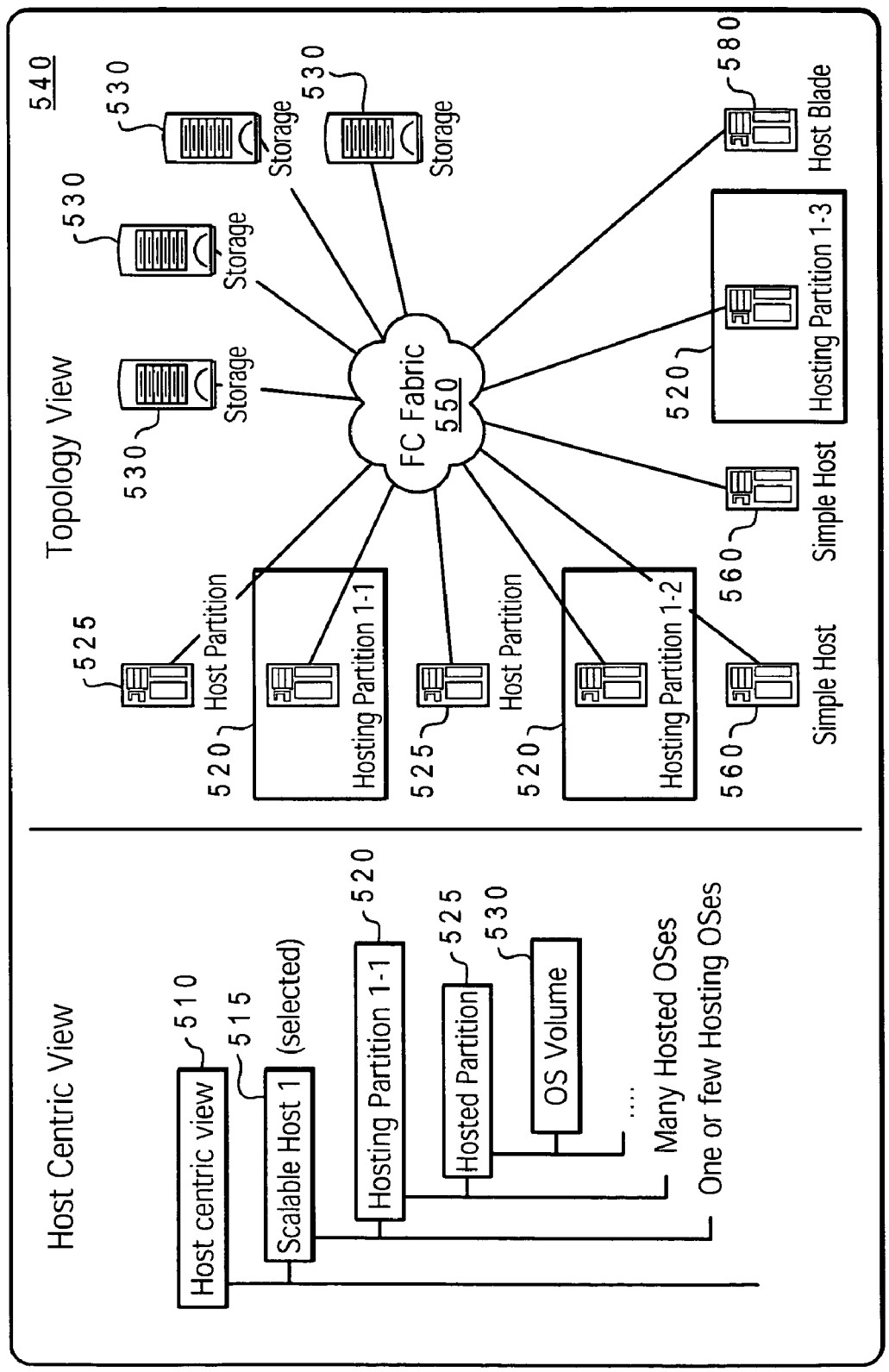
FIG. 5 illustrates a graphical user interface (GUI) representation of adjoining host centric and topology views according to one embodiment of the invention.

As illustrated by the figures and described above, the invention extends SAN manager to provide a GUI display of how hosting partitions, blades, and/or cluster members physically connect into the SAN. FIGS. 3 and 4A, in particular, illustrated the discovery of and display of all physical host partitions with physical connections into the SAN in a physical topology view. In one implementation, illustrated by FIG. 5, the topology view of FIG. 4A is further extended to highlight all host partitions in a physical SAN topology view that belong to a particular scalable host. The illustration of FIG. 5 is a specific illustration for a zSeries logically partitioned host.

As illustrated, the GUI display screen is partitioned into two side-by-side display windows providing concurrent host centric view and topology view. Host centric view 510 provides a series of levels, the first of which depicts a scalable host 515. Below the scalable host 515 in descending levels are the hosting partition 520, then the hosted partition 525, followed by the OS volume 430. At each level, a plurality of similar components may be included. Thus, the scalable host may include multiple hosting partitions at the next level, and a particular hosting partition may be illustrated with multiple hosted partitions 525 at the next level.

Included in the functionality of SANM utility is the ability for the user to subsequently select one of the scalable hosts, such as "Scaleable Host 1" while in the host centric view. When the user selects "Scalable Host 1," the SANM utility highlights all hosting partitions belonging to Scalable Host 1 that are physically connected into the SAN. SANM utility then splits the display to provide another window to display the corresponding topology view. A dual-display or split-screen configuration of the GUI results, and both the host centric view and topology view are displayed simultaneously by the SANM GUI in separate windows. In one implementation, the above functionality of splitting the display to show a second window with the topology view occurs when the user selects a specific host cluster or host blade farm within their respective host centric views.

Topology view 540 provides a pan out view of SAN connectivity to a centralized fabric 520. Each of the hardware components capable of being displayed within host centric view 510 is shown connected to the FC fabric 550. Thus, in addition to those illustrated in the host centric view 510, topology view 540 illustrates the additional hardware components. For example, topology view 540 includes hosting partitions 1-1 and 1-2 520 and multiple host partitions 525. Additionally, topology view 540 displays the storage devices 530, a set of simple hosts 560 and a host blade 580. SANM utility provides another window in a split screen configuration of the GUI and both the host centric view and topology view are displayed simultaneously by the SANM GUI in separate window panes. Notably, a similar splitting of the window occurs when the user selects a host cluster or host blade farms from within their respective host centric views.

Figure 6B:
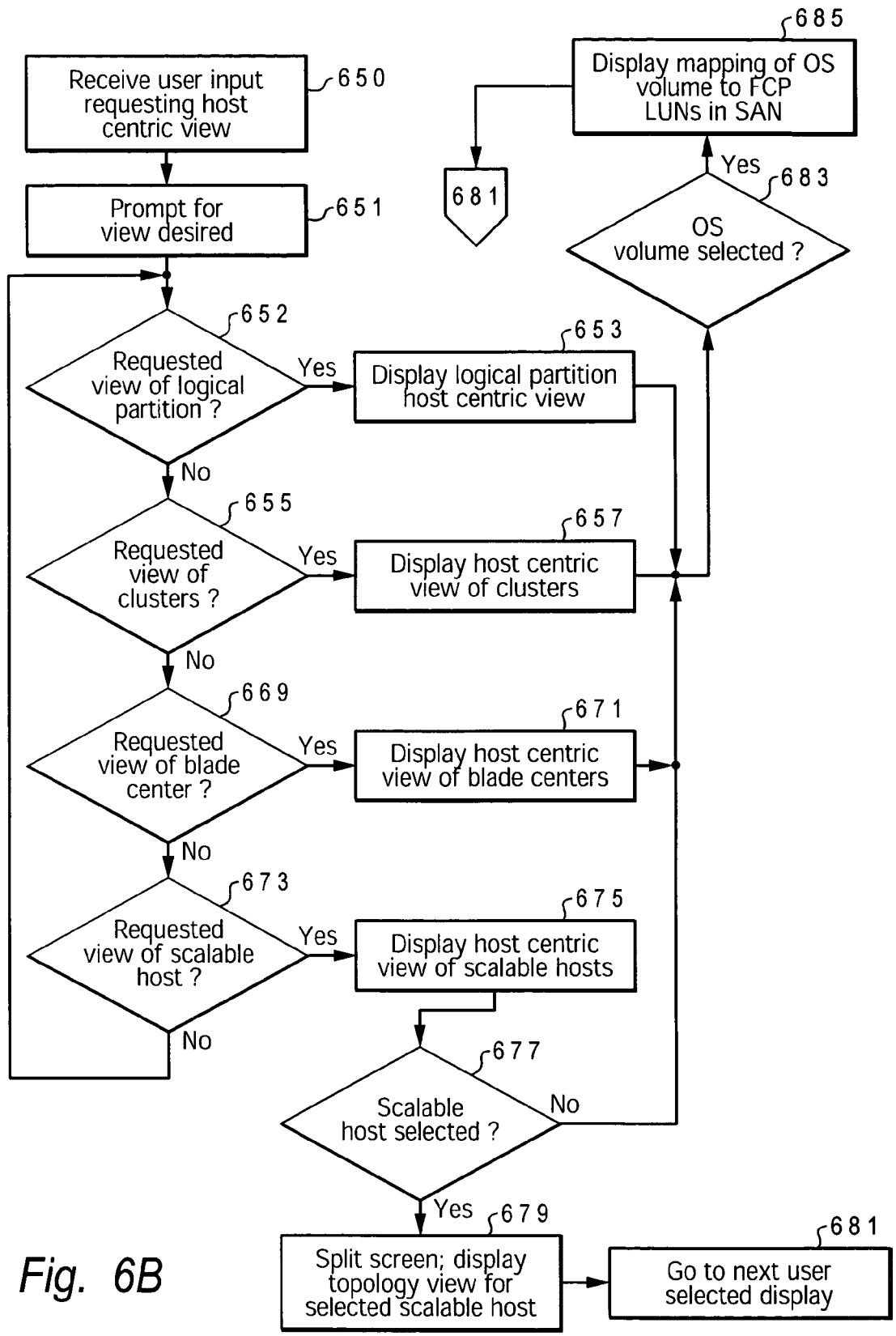
FIG. 6B illustrates the process of selecting and toggling between different host centric views based on user selections in accordance with one embodiment of the invention.

FIG. 6B illustrates the process of selecting between views and other features of the SANM utility as provided by the invention. The process begins when the utility receives a user selection requesting a display of a host centric view. The user is prompted at step 651 for the particular view desired and a series of steps (steps 652, 655, 669, and 673) are provided to determining which of several available views is selected by the user. In actual implementation, the GUI may provide a menu list of available views, and the user selects one item from the list using the input device of the computer system. When the user selects a view type (from among logical partition, clusters, blade centers, and scalable hosts), the corresponding host centric view is displayed within the GUI. Thus, as illustrated, if the user selects the logical partition view at decision block 652, the utility displays the logical partition host centric view, as shown at step 653. Likewise, selection of the cluster view at decision block 655 or selection of blade center view at decision block 673 results in a display of the host centric view of clusters or the host centric view of the blade centers, respectively.

From within the display of each host centric view (steps 653, 657, 671, and 675), the SANM utility determines at decision block 683 whether the user selects an OS volume within the displayed pane. User selection of the OS volume results in the display of the mapping of the OS volume to the FCP LUs within the SAN, as provided at step 685. Notably, in one embodiment, the user is also provided a selectable option to reverse/toggle the view back from the OS volume mapping to the specific host centric view from which the OS mapping originates. Thus, selecting a physical host partition in the topology view 540 with OS mapping causes the location of the associated owning host system (or cluster) and subsequent display in the host-centric view.

When the user selects a view of the scalable host at step 673, the user is first provided with just the host centric view of the scalable hosts, as depicted at step 675. At decision step 677 a determination is made whether the user selects a scalable host from within the host centric view for scalable hosts. If the user selects a scalable host, then at step 679, SANM utility provides another window in the split screen configuration of the GUI and both the host centric view and topology view are displayed simultaneously by the SANM GUI in separate window panes. Then, the utility proceeds to display the view that is next selected by the user, as shown at step 681.

Implementation of these views in the SAN Manager provides comprehensive management of SANs that include scalable hosts. By a simple click of a button and view of a GUI, a user is provided a display of (1) what host partitions are participating in the SAN, (2) how they are connected into the SAN, and (3) how they relate to the high level system (or cluster).

As a final matter, it is important that while an illustrative embodiment of the present invention has been, and will continue to be, described in the context of a fully functional computer system providing SAN management functionality, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A system comprising:
    a processor;
    a connection device for connecting to other components via a storage area network (SAN); and
    management application running on said processor that provides the following functionality:
        displaying, within a host-centric logical view of the SAN, a host partition hierarchy and storage resource ownership for an attached scalable host system having a plurality of logical and physical partitions, at least some of the partitions having dedicated HBAs and SAN connectivity via a bundled fibre channel switch in the host system, wherein said host-centric view includes the host system, hosting operating systems (OSes), hosted OSes for each hosting OS, OS volumes for each hosted OS, and logical mapping of each OS volume to a SAN storage resource; and
        providing a view of a connectivity of hosting and trusted components within the host-centric logical view, said components selected from among partitions, blades, and clusters.

2. The system of claim 1, further comprising:
    a storage device; and
    a discovery utility associated with said management application that provides the following features:
        deploying SAN agents to discover each physical host partition with physical connection in the SAN, said deploying deploys full function agents to hosting OSes and lightweight minimal function agents to hosted OSes, wherein said agents are SAN-level agents that are not OS-specific;
        optionally deploying storage resource management agents on hosted partitions; and
        collecting the information required to enable the views of both the host clusters and the blade farms via T11/FC-GS-4 extended platform registration, wherein extended platform registration allows platforms, including the blades and the host systems to register with the fabric, and to also indicate the system identifier (ID) or cluster ID to which the platform belongs.

3. The system of claim 1, wherein:
    one or more logical OSes share one or more HBAs (host bus adapters) connected to the SAN, and one or more trusted hosting partitions own the HBA(s) and host a plurality of hosted OS partitions, which are not trusted partitions and which have a virtual view of the HBA; and
    said providing a view of the connectivity comprises providing a view of how hosting partitions, blades, and cluster members physically connect into the SAN, wherein the topology view is further extended to highlight all host partitions in a physical SAN topology view that belong to a particular scalable host.

4. The system of claim 1, further comprising:
    an input device; and
    an output device;
    wherein said displaying functions of said management application comprises:
        displaying a graphical user interface (GUI) on said output device; and
        providing selectable options for a user to select a view desired for display,
    wherein a top level view is selected from among display of one of partitions, blades, and clusters, wherein said selectable options includes a "find" function displayed within the GUI to enable the user to locate one of a host partition and an OS volume among stacks of OS partitions and OS volumes within the SAN.

5. The system of claim 1, wherein said displaying functions comprises:
    enabling user selection from among a scalable host-centric view and a physical host partition topology view, wherein an owning host system is located when in the host-centric view;
    automatically generating the view selected by the user utilizing data within configuration tables; and
    enabling the user to toggle between a top level view and a second view when the user selects an OS volume while in the top level view, wherein said second view displays a mapping of the selected OS volume to Fibre Channel Protocol (FCP) Logical Units (LUs) in the SAN.

6. The system of claim 5, wherein said display functions further comprises:
    when a selection of a scalable host is received, automatically providing a next window within a split screen configuration of the GUI to simultaneously display both the host centric view and topology view in separate window panes;
    concurrently displaying the host centric view and a topology view in adjacent windows within the GUI; and
    enabling dynamic change of the topology view to highlight hosting partitions associated with a scalable host selected by a user within the host centric view.

7. A storage area network (SAN) comprising:
    a plurality of managed components coupled to a fabric of the SAN; and
    a SAN manager also coupled to the fabric and which includes a management application that provides the following features:
        displaying, within a host-centric logical view of the SAN, a host partition hierarchy and storage resource ownership for an attached scalable host system having a plurality of logical and physical partitions, at least some of the partitions having dedicated HBAs and SAN connectivity via a bundled fibre channel switch in the host system, wherein said host-centric view includes the host system, hosting operating systems (OSes), hosted OSes for each hosting OS, OS volumes for each hosted OS, and logical mapping of each OS volume to a SAN storage resource; and
        providing a view of a connectivity of hosting and trusted components within the host-centric logical view, said components selected from among partitions, blades, and clusters.

8. The SAN of claim 7, said management application further comprising a discovery utility associated with said management application that provides the following:
    deploying SAN agents to discover each physical host partition with physical connection in the SAN, said deploying deploys full function agents to hosting OSes and lightweight minimal function agents to hosted OSes, wherein said agents are SAN-level agents that are not OS-specific;

optionally deploying storage resource management agents on hosted partitions; and collecting the information required to enable the views of both the host clusters and the blade farms via Ti11/FC-GS-4 extended platform registration, wherein extended platform registration allows platforms, including the blades and the host systems to register with the fabric, and to also indicate the system identifier (ID) or cluster ID to which the platform belongs.

9. The SAN of claim 7, wherein:

one or more logical OSes share one or more UBAs (host bus adapters) connected to the SAN, and one or more trusted hosting partitions own the HBA(s) and host a plurality of hosted OS partitions, which are not trusted partitions and which have a virtual view of the UBA; and said providing a view of the connectivity comprises providing a view of how hosting partitions, blades, and cluster members physically connect into the SAN, wherein the topology view is further extended to highlight all host partitions in a physical SAN topology view that belong to a particular scalable host.

10. The SAN of claim 7, said SAN manager further comprising:

an input device; and an output device;

wherein said displaying functions of said management application comprises:

displaying a graphical user interface (GUI) on said output device; and providing selectable options for a user to select a view desired for display, wherein a top level view is selected from among display of one of partitions, blades, and clusters, wherein said selectable options includes a "find" function displayed within the GUI to enable the user to locate one of a host partition and an OS volume among stacks of OS partitions and OS volumes within the SAN.

11. The SAN of claim 7, wherein said management application further comprises:

enabling user selection from among a scalable host-centric view and a physical host partition topology view, wherein an owning host system is located when in the host-centric view;

automatically generating the view selected by the user utilizing data within configuration tables; and enabling the user to toggle between the top level view and a second view when the user selects an OS volume while in the top level view, wherein said second view displays a mapping of the selected OS volume to Fibre Channel Protocol (FCP) Logical Units (LUs) in the SAN.

12. The SAN of claim 11, wherein said management application further comprises:

when a selection of a scalable host is received, automatically providing a next window within a split screen configuration of the GUI to simultaneously display both the host centric view and topology view in separate window panes;

concurrently displaying the host centric view and a topology view in adjacent windows within the GUI; and enabling dynamic change of the topology view to highlight hosting partitions associated with a scalable host selected by a user within the host centric view.

13. A computer program product comprising:

a recordable type medium; and program instructions on said recordable type medium including code for:

displaying, within a host-centric logical view of the SAN, a host partition hierarchy and storage resource ownership for an attached scalable host system having a plurality of logical and physical partitions, at least some of the partitions having dedicated HBAs and SAN connectivity via a bundled fibre channel switch in the host system, wherein said host-centric view includes the host system, hosting operating systems (OSes), hosted OSes for each hosting OS, OS volumes for each hosted OS, and logical mapping of each OS volume to a SAN storage resource;

providing a view of a connectivity of hosting and trusted components within the host-centric logical view, said components selected from among partitions, blades, and clusters;

wherein one or more logical OSes share one or more HBAs (host bus adapters) connected to the SAN, and one or more trusted hosting partitions own the HBA(s) and host a plurality of hosted OS partitions, which are not trusted partitions and which have a virtual view of the HBA; and said providing a view of the connectivity comprises providing a view of how hosting partitions, blades, and cluster members physically connect into the SAN, wherein the topology view is further extended to highlight all host partitions in a physical SAN topology view that belong to a particular scalable host.

14. The computer program product of claim 13, further comprising program code for:

deploying SAN agents to discover each physical host partition with physical connection in the SAN, said deploying deploys full function agents to hosting OSes and lightweight minimal function agents to hosted OSes, wherein said agents are SAN-level agents that are not OS-specific;

optionally deploying storage resource management agents on hosted partitions; and collecting the information required to enable the views of both the host clusters and the blade farms via T11/FC-GS-4extended platform registration, wherein extended platform registration allows platforms, including the blades and the host systems to register with the fabric, and to also indicate the system identifier (ID) or cluster ID to which the platform belongs.

15. The computer program product of claim 13, further comprising program code for:

displaying a graphical user interface (GUI) with selectable options for a user to select a view desired for display, wherein a top level view is selected from among display of one of partitions, blades, and clusters, wherein said selectable options includes a "find" function displayed within the GUI to enable the user to locate one of a host partition and an OS volume among stacks of OS partitions and OS volumes within the SAN; and displaying a respective view within the GUI based on a user selection.

16. The computer program product of claim 13, further comprising program code for:

enabling user selection from among a scalable host-centric view and a physical host partition topology view, wherein an owning host system is located when in the host-centric view;

automatically generating the view selected by the user utilizing data within configuration tables; and enabling the user to toggle between the top level view and a second view when the user selects an OS volume while in the top level view, wherein said second view displays a mapping of the selected OS volume to Fibre Channel Protocol (FCP) Logical Units (LUs) in the SAN.

17. The computer program product of claim 16, further comprising program code for:

when a selection of a scalable host is received, automatically providing a next window within a split screen configuration of the GUI to simultaneously display both the host centric view and topology view in separate window panes;

concurrently displaying the host centric view and a topology view in adjacent windows within the GUI; and enabling dynamic change of the topology view to highlight hosting partitions associated with a scalable host selected by a user within the host centric view.

18. The system of claim 1, said management application further providing the functionality of:

managing the partitioned hosts by extending SAN manager host-centric logical views to show (1) the host partition hierarchy and (2) the storage resource ownership for a SAN-attached scalable host; and extending the SAN manager view to show how hosting (trusted) partitions, blades, and/or cluster members physically connect to a SAN.

19. The SAN of claim 7, said management application further providing the functionality of:

managing the partitioned hosts by extending SAN manager host-centric logical views to show (1) the host partition hierarchy and (2) the storage resource ownership for a SAN-attached scalable host; and extending the SAN manager view to show how hosting (trusted) partitions, blades, and/or cluster members physically connect to a SAN.

20. The computer program product of claim 13, further comprising program code for:

managing the partitioned hosts by extending SAN manager host-centric logical views to show (1) the host partition hierarchy and (2) the storage resource ownership for a SAN-attached scalable host; and extending the SAN manager view to show how hosting (trusted) partitions, blades, and/or cluster members physically connect to a SAN.

* * * * *